(12) United States Patent
Chen

(10) Patent No.: US 8,012,226 B2
(45) Date of Patent: Sep. 6, 2011

(54) AIR SEPARATOR AND PURIFIER DEVICE

(76) Inventor: Ging-Chung Chen, Danshui Town, Taipei County (TW)

( * ) Notice: Subject to any disclaimer, the term of this patent is extended or adjusted under 35 U.S.C. 154(b) by 0 days.

(21) Appl. No.: 11/826,699

(22) Filed: Jul. 17, 2007

(65) Prior Publication Data

US 2011/0138757 A1     Jun. 16, 2011

(51) Int. Cl.
*B01D 50/00*     (2006.01)
(52) U.S. Cl. .............. 55/319; 55/320; 55/337; 55/400; 55/406; 55/438; 55/486
(58) Field of Classification Search .............. 55/318, 55/320, 319, 337, 400, 406, 437, 438, 486
See application file for complete search history.

(56) References Cited

FOREIGN PATENT DOCUMENTS

JP     09122419 A   *   5/1997

* cited by examiner

*Primary Examiner* — Robert A Hopkins
(74) *Attorney, Agent, or Firm* — Muncy, Geissler, Olds & Lowe, PLLC

(57) ABSTRACT

An air separator and purifier device, structured to mainly include a main air extractor installed within a cylindrical housing, an air inlet and an air vent are provided in the upper and lower ends of the housing respectively to form a filter passageway, and filtering equipment is installed in the filter passageway. The air separator and purifier device is characterized in that: the housing includes an upper cylindrical body and a lower cylindrical body; a partition plate is located between the upper and lower cylindrical bodies; a round hole defined in the center of the partition plate connects with an air suction port of the main air extractor installed within the lower cylindrical body; and a preseparation structure and an air filter screen are installed within the upper cylindrical body and the lower cylindrical body respectively.

6 Claims, 5 Drawing Sheets

AIR SEPARATOR AND PURIFIER DEVICE

BACKGROUND OF THE INVENTION (a) Field of the Invention

The present invention relates to an air separator and purifier device, and more particularly to an air separator and purifier device able to separate out and purify impurities (including: dust, ash and smoke, oil and smoke or moisture . . . and so on) contained in air, which primarily comprises a turbine type main air extractor installed within a housing assembled from a superposition of an upper cylindrical body and a lower cylindrical body, and a preseparation structure and an air filter screen filter equipment located in a filter passageway formed between the upper and lower cylindrical bodies. Different preseparation structures can be used to achieve separating out different impurities, thereby providing effectiveness to obtain pure and fresh air.

(b) Description of the Prior Art

The increasing demands for improved quality of life and environmental consciousness of present society, even the stringent demands industries have towards waste gas emissions, and strict conditions for indoor air temperature, humidity and dust fall have brought about a requirement for pure air, however, prior art devices are only truly effective in separating and filtering a portion of impurities contained in air.

In light of the increasing demands people have for improved air quality, the inventor of the present invention, having accumulated years of experience in related arts, has meticulously carried out extensive study and exploration to ultimately design a new air separator and purifier device.

SUMMARY OF THE INVENTION

A primarily objective of the present invention is to provide an air separator and purifier device having a structure which effectively filters out impurities contained in the air, including dust, ash and smoke, oil and smoke or moisture, and which extends the serviceable life of the main air extractor.

In order to achieve the aforementioned objective, the air separator and purifier device of the present invention is primarily structured to comprise a main air extractor installed within a cylindrical housing. An air inlet and an air vent are provided in the upper and lower ends of the housing respectively forming a filter passageway, and more than one layer of filtering equipment are installed in a filter passageway; wherein:

The housing comprises a superposition of an upper cylindrical body and a lower cylindrical body, wherein the center of a top surface of the upper cylindrical body is provided with the air inlet, and the air vent is located in a bottom surface of the lower cylindrical body. A partition plate is located between the upper cylindrical body and the lower cylindrical body, and a round hole is defined in the center of the partition plate.

The main air extractor is installed in a central position of the lower cylindrical body, and comprises a dish shaped case fixed to a motor. Turbine blades are installed within the dish shaped case, and the turbine blades are joined to a rotating shaft of the motor, thereby enabling the turbine blades to rotate. A top surface of the dish shaped case is provided with an air suction port, and a plurality of gill shaped air outlets are annular defined along a tangential direction of a side wall of the dish shaped case.

The filtering equipment comprises a preseparation structure installed within the upper cylindrical body and an air filter screen located within the lower cylindrical body.

According to the aforementioned assemblage, after the main air extractor has been actuated and is running, then a negative pressure forms interior of the upper cylindrical body, which causes waste gas to be sucked into the air inlet located center of the top surface, whereupon the waste gas passes through the preseparation structure and dust, smoke and ash or oil, water, and so on, are separated out from the air. Next, only after the initial separation and filtration does the air enter the dish shaped case through the air suction port of the top surface of the dish shaped case, after which the air is blown out from the gill shaped air outlets of the side wall of the dish shaped case, and only after the air passes through the air filter screen located in the lower cylindrical body and undergoes secondary filtration is it discharged out through the air vents of the bottom surface of the lower cylindrical body, thereby enabling achieving efficient and superior air filtration effectiveness and extending the serviceable life of the main air extractor.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
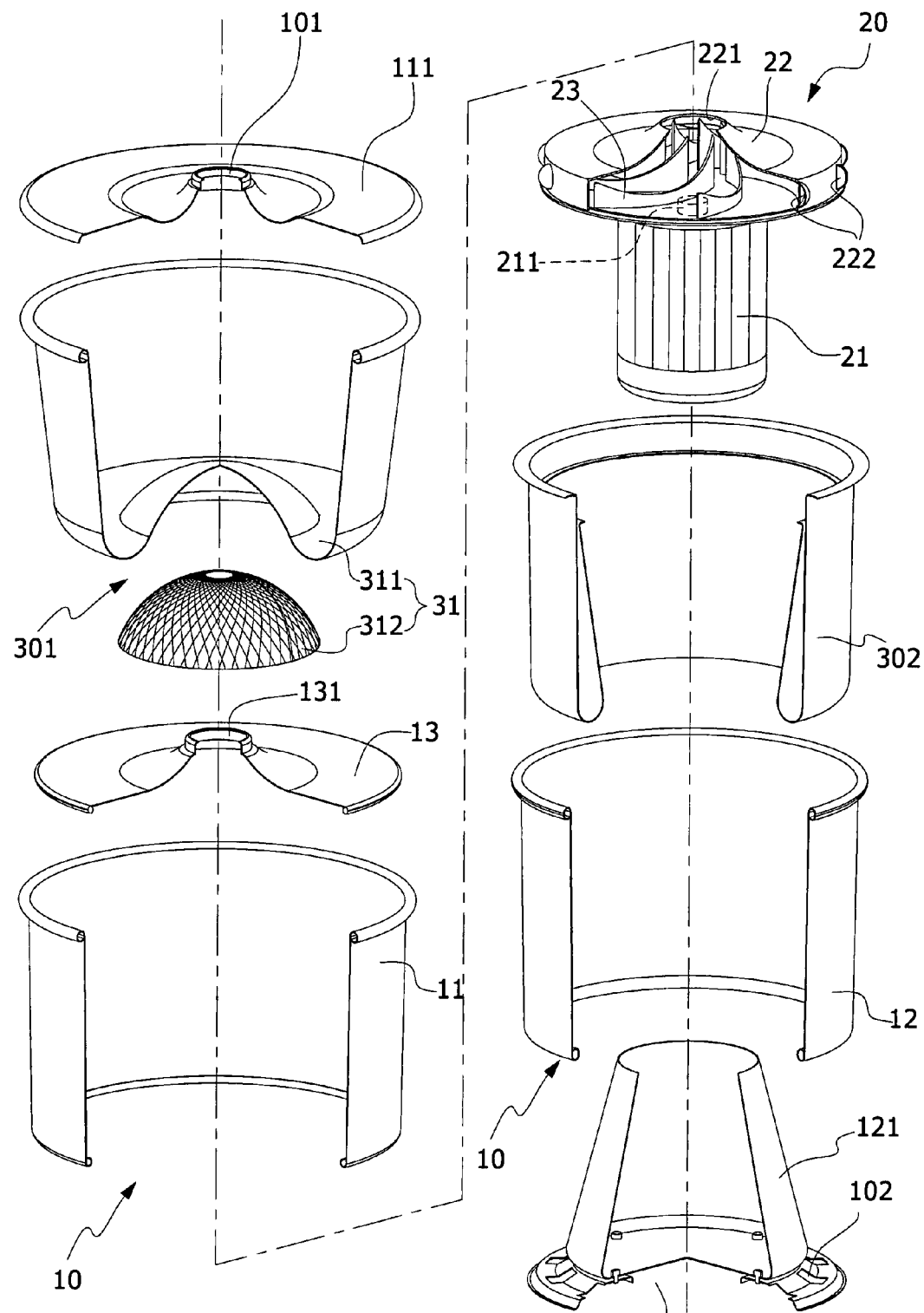
FIG. 1 shows an exploded elevational view of one embodiment according to the present invention.

Referring to FIGS. 1 to 4, which show an air separator and purifier device of the present invention, primarily structured to comprise a main air extractor 20 installed within a cylindrical housing 10. An air inlet 101 and an air vent 102 are provided in the upper and lower ends of the housing 10 respectively, thereby forming a filter passageway 103 within the housing 10. Moreover, more than one layer of filtering equipment is installed in the filter passageway 103.

The housing 10 is a structure comprising a superposition of an upper cylindrical body 11 and a lower cylindrical body 12, wherein the air inlet 101 is defined in a top surface of the cylindrical body 11, and the air vent 102 (which can be a plurality of vent holes annular defined in a periphery of a bottom plate or/and one vent hole defined in a center of the bottom surface) is located in a bottom surface of the lower cylindrical body 12. A partition plate 13 is located between the upper cylindrical body 11 and the lower cylindrical body 12, and a round hole 131 is defined in the center of the partition plate 13. The round hole 131 provides a passage for the filter passageway 103; between the upper cylindrical body 11 and the lower cylindrical body 12.

The main air extractor 20 is installed in a central position of the lower cylindrical body 12, and comprises a dish shaped case 22 fixed to a motor 21, and turbine blades 23 are installed within the dish shaped case 22. The turbine blades 23 are joined to a rotating shaft 211 of the motor 21, thereby enabling the turbine blades 23 to rotate. A top surface of the dish shaped case 22 is provided with an air suction port 221, and a plurality of gill shaped air outlets 222 are annular defined along a tangential direction of a side wall of the dish shaped case 22.

The filtering equipment comprises a preseparation structure 301 installed within the upper cylindrical body 11 and an air filter screen 302 located within the lower cylindrical body 12.

According to the aforementioned, an embodiment of the present invention comprises the partition plate 13 fixedly installed to a bottom portion of the upper cylindrical body 11, or the partition plate 13 can be fixed to a top end of the lower cylindrical body 12, or directly derived from a top plate of the dish shaped case 22 of the main air extractor 20. An outer portion of the motor 21 of the main air extractor 20 is covered by a covering body 121, thereby separating the filter passageway 103 to facilitate controlling airtightness of the filter passageway 103 and preventing the motor from accumulating dust.

According to the aforementioned assemblage, after the main air extractor 20 has been actuated and is running, then a negative pressure forms interior of the upper cylindrical body 11, which causes waste gas (air awaiting processing) to be sucked into the air inlet 101 located center of the top surface, whereupon the waste gas passes through the preseparation structure 301 and dust, smoke and ash or oil, water, and so on, are separated out from the air. Next, only after the initial separation and filtration does the air enter the main air extractor 20 through the air suction port 221 of the top surface of the main air extractor 20, and then blown out from the gill shaped air outlets 222 of the side wall, and after the air passes through the air filter screen 302 located in the lower cylindrical body 12 and undergoes secondary filtration is the air discharged out through the air vents 102 of the bottom surface of the lower cylindrical body 12, thereby achieving effectiveness to separate out impurities and purify air. Moreover, multiple separation and filtration effectiveness can be used to lengthen serviceable life of the device.

According to the aforementioned configuration, the preseparation structure 301 within the upper cylindrical body 11 can be a dust collecting set 31 or an air purifying set 32 or an oil and gas separating set 33, thereby accommodating application to separate and filter different impurities, including dust, ash and smoke or oil and smoke, moisture, and so on.

Figure 2:
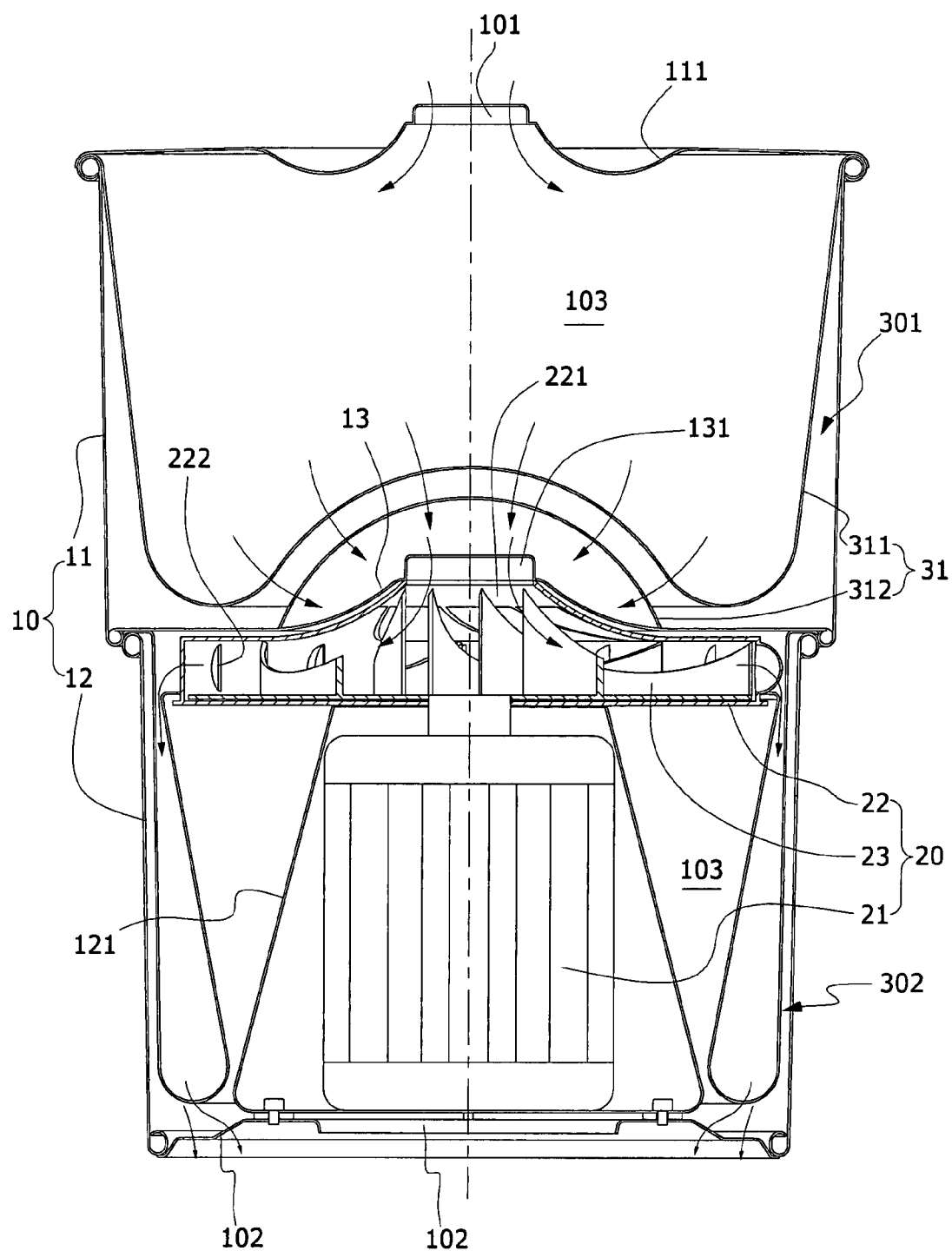
FIG. 2 shows a cross-sectional view of FIG. 1 assembled according to the present invention.
Figure 3:
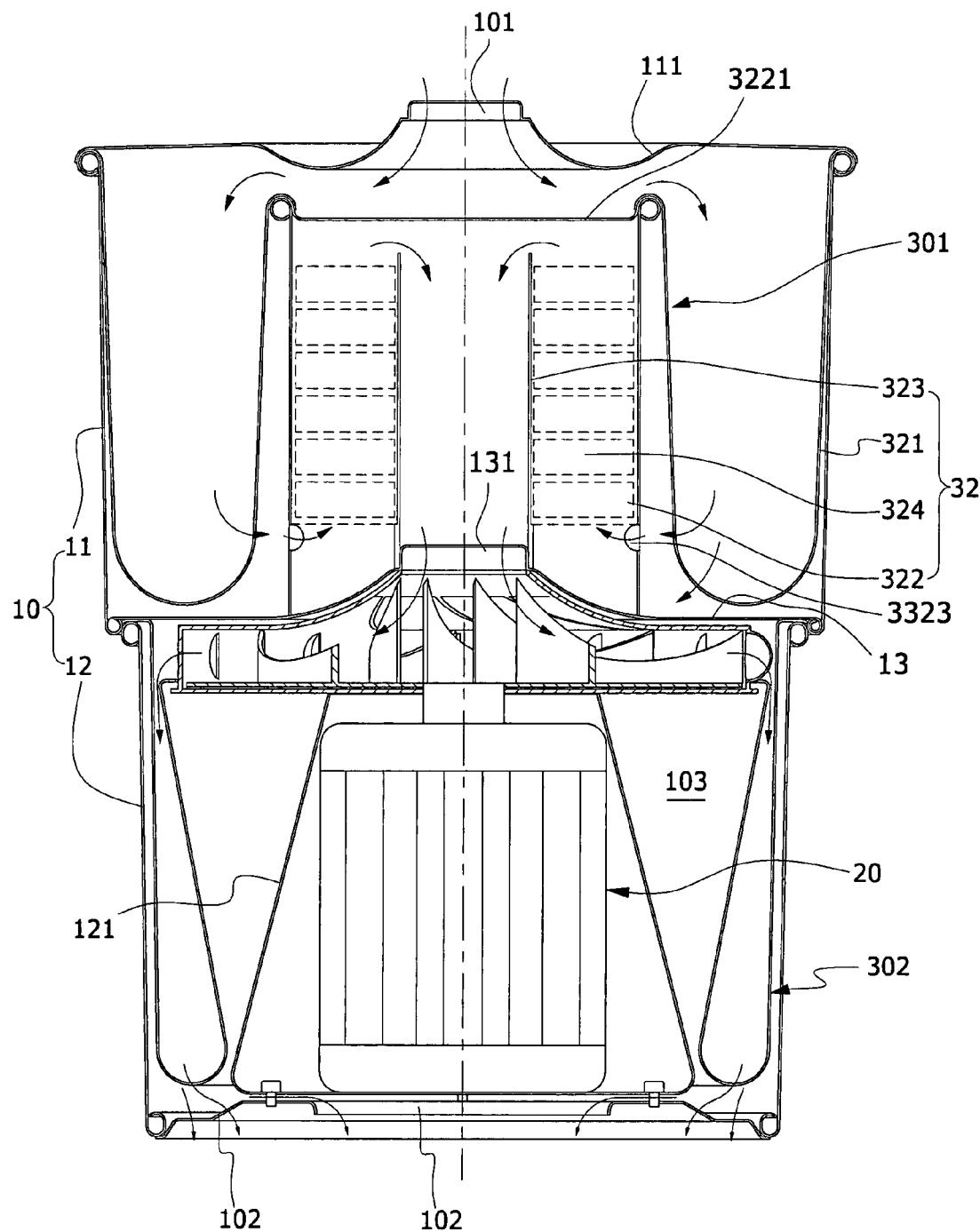
FIG. 3 shows a cross-sectional view of another embodiment assembled according to the present invention.
Figure 4:
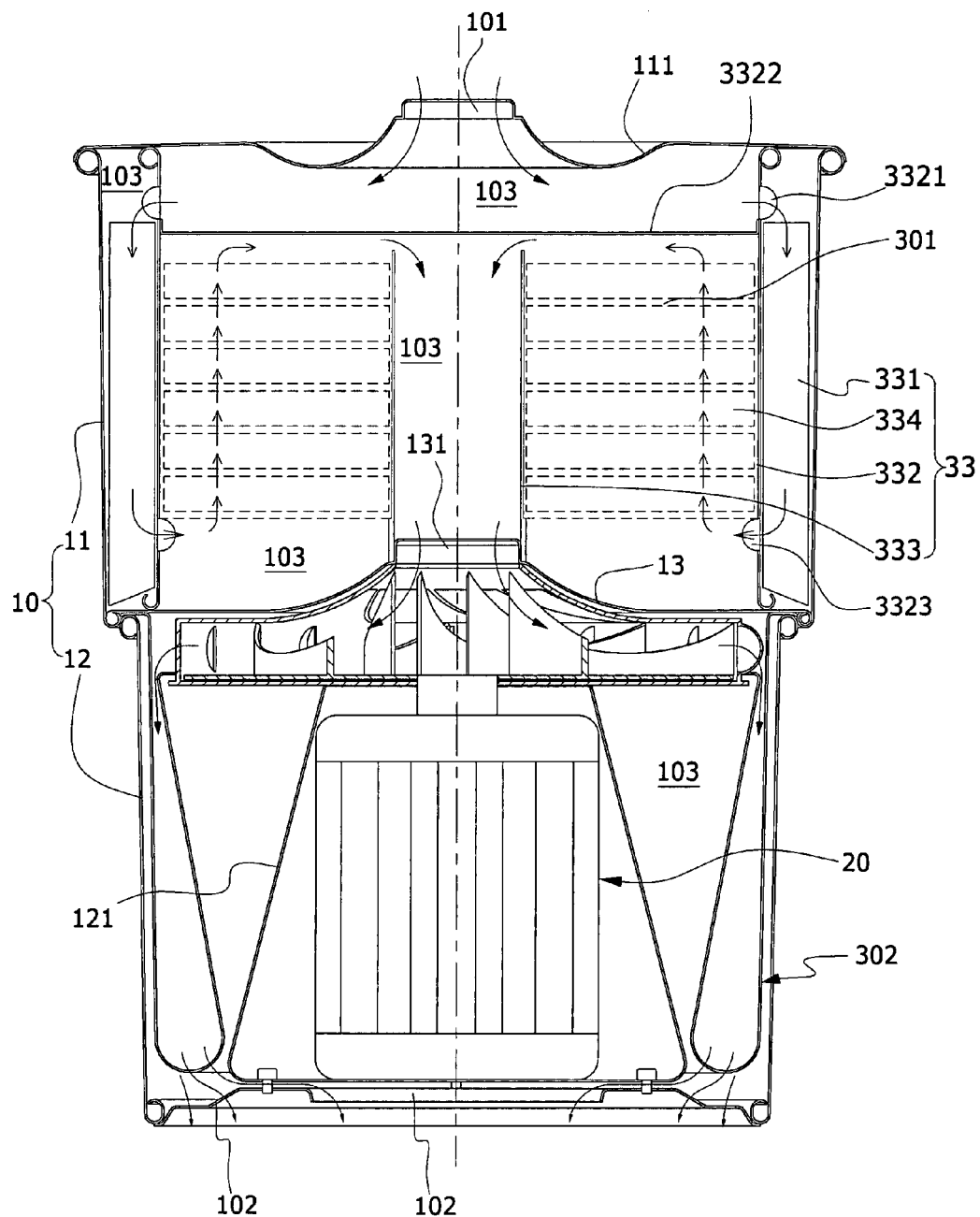
FIG. 4 shows a cross-sectional view of yet another embodiment assembled according to the present invention.

The dust collecting set 31 (as depicted in FIG. 1 and FIG. 2) is structured to comprise a dust collecting bag 311 and a wire mesh 312. The dust collecting bag 311 assumes a circular bag form, the bag opening of which is mounted between the rim of an upper end opening of the upper cylindrical body 11 and a top cover 111. The wire mesh 312 assumes a hemispherical form, and covers the round hole 131 of the partition plate 13 located between the upper and lower cylindrical bodies 11, 12. When the assemblage is in use, because of a gap formed between the wire mesh 312 support and the round hole 131 of the partition plate 13, thus, a bottom portion of the dust collecting bag 311 is prevented from clinging to the inner wall of the upper cylindrical body 11 and to the partition plate 13, thereby increasing ventilation area. Hence, after entering the dust collecting bag 311 through the air inlet 101, the waste gas is able to uniformly enter the lower cylindrical body 12 through the dust collecting bag 311 via the round hole 131, and thereby effect comparatively large dust filtration effectiveness.

The air purifying set 32 (see FIG. 3) comprises a ring-like dust collecting bag 321, a middle cylinder 322, an inner tube 323, and multiple layers of air filter material 324 located between the middle cylinder 322 and the inner tube 323. The middle cylinder 322 is fixed to the partition plate 13 located between the upper and lower cylindrical bodies 11, 12, and a cover plate 3221 is located on the top surface of the middle cylinder 322. Moreover, a plurality of gill shaped air outlets 3222 are annular defined along a tangential direction of a wall at a bottom end of the middle cylinder 322, and the inner tube 323 is mounted on the round hole 131 located center of the aforementioned partition plate 13. Furthermore, a section of space is provided between the top end and a bottom surface of the cover plate 3221 of the middle cylinder 322. An outer rim of the ring-like dust collecting bag 321 is mounted between the upper end rim of the upper cylindrical body 11 and the top cover 111, and an inner rim of the ring-like dust collecting bag 321 is mounted between the top edge of the middle cylinder 322 and the cover plate 3221. When assembled and in use, disposition of the middle cylinder 322 and the inner tube 323 enables the filter passageway 103 within the upper cylindrical body 11 to form an inwardly meandering state, which extends the length of the filter passageway 103 and enables additional installation of even more of the air filter materials 324. Waste gas entering the upper cylindrical body 11 follows the paths indicated by the arrows shown in the drawing, and the ring-like dust collecting bag 321 operates in coordination with functionality of multiple layers of the air filter material 324 (such as activated carbon or electrode mesh, and so on) disposed in the passageway between the middle cylinder 322 and the inner tube 323, thereby providing the present invention with air purification effectiveness of dust removal, deodorization or sterilization or increase negative ions.

The oil and gas separating set 33 (see FIG. 4) is structured to comprise a ring-like oil (water) collecting mesh 331, a middle cylinder 332, an inner tube 333 and multiple layers of air filter material 334 located between the middle cylinder 332 and the inner tube 333. The ring-like oil collecting mesh 331 is disposed between the inner wall of the upper cylindrical body 11 and the outer wall of the middle cylinder 332. The middle cylinder 332 is fixed to the partition plate 13 located between the upper cylindrical body 11 and the lower cylindrical body 12. A plurality of outward gill shaped air outlets 3321 are annular defined along a tangential direction of a wall at the top end of the middle cylinder 332, and a cover plate 3322 is located at a lower edge of the gill shaped air outlets 3321. Moreover, a plurality of inward gill shaped air outlets 3323 are annular defined along a tangential direction of the wall at the bottom end of the middle cylinder 332. The inner tube 333 is mounted on the round hole 131 located center of the aforementioned partition plate 13, and a section of space is provided between the top end of the inner tube 333 and the bottom surface of the cover plate 3322 of the middle cylinder 332.

According to the aforementioned configuration, when implementing the ring-like oil collecting mesh 331, a plurality of sheets of vertical screens can be radially arranged, or a plurality of sheets of ring-like screens can be arranged in a top to bottom multiple layer configuration, or one screen can be used and wound round in a spiral fashion, thereby causing oil or water contained in waste gas to adhere to the ring-like oil collecting mesh 331, and thus achieve the objective of separating and collecting oil content or water content contained in air. Moreover, disposition of the middle cylinder 332 and the inner tube 333 enables the filter passageway 103 within the upper cylindrical body 11 to form an inwardly meandering state, which extends the length of the filter passageway 103 and enables additional installation of even more of the air filter material 334. Waste gas entering the upper cylindrical body 11 follows the paths indicated by the arrows shown in the drawing, and after the initial separation operation of passing through the ring-like oil collecting mesh 331 structure, the air then passes through the air filter material 334 (such as an oil screen or activated carbon, electrode mesh, and so on) disposed in the passageway between the middle cylinder 332 and the inner tube 333, where a secondary oil and water separation operation is carried out, or/and air purification operations comprising dust removal, deodorization or sterilization or increase negative ions is carried out to achieve the anticipated objectives of the present invention.

According to the aforementioned various preseparation structures 301, depending on the different filter material or structures used, relatively large particles of dust or oil material or water content can be filtered out prior to waste gas entering the main air extractor 20, thereby apart from achieving separation and filtration of impurities contained in the air, moreover, contamination of the main air extractor 20 and the air filter screen 302 located within the lower cylindrical body 12 can be reduced, thus extending the serviceable life thereof.

Referring again to FIGS. 1 to 4, the air filter screen 302 within the lower cylindrical body 12 assumes a ring-like bag form, and an outer rim of the air filter screen 302 is mounted on the upper end rim of the lower cylindrical body 12, and an inner rim of the air filter screen 302 is mounted on a bottom plate of the dish shaped case 22 of the main air extractor 20. Moreover, the mesh of the air filter screen 302 is smaller than that of the filter screen of the preseparation structure 301 or the mesh (gaps) of the filter material. Accordingly, the air filter screen 302 is able to filter out relatively fine particles of dust, and achieve superior air purification effectiveness.

Figure 5:
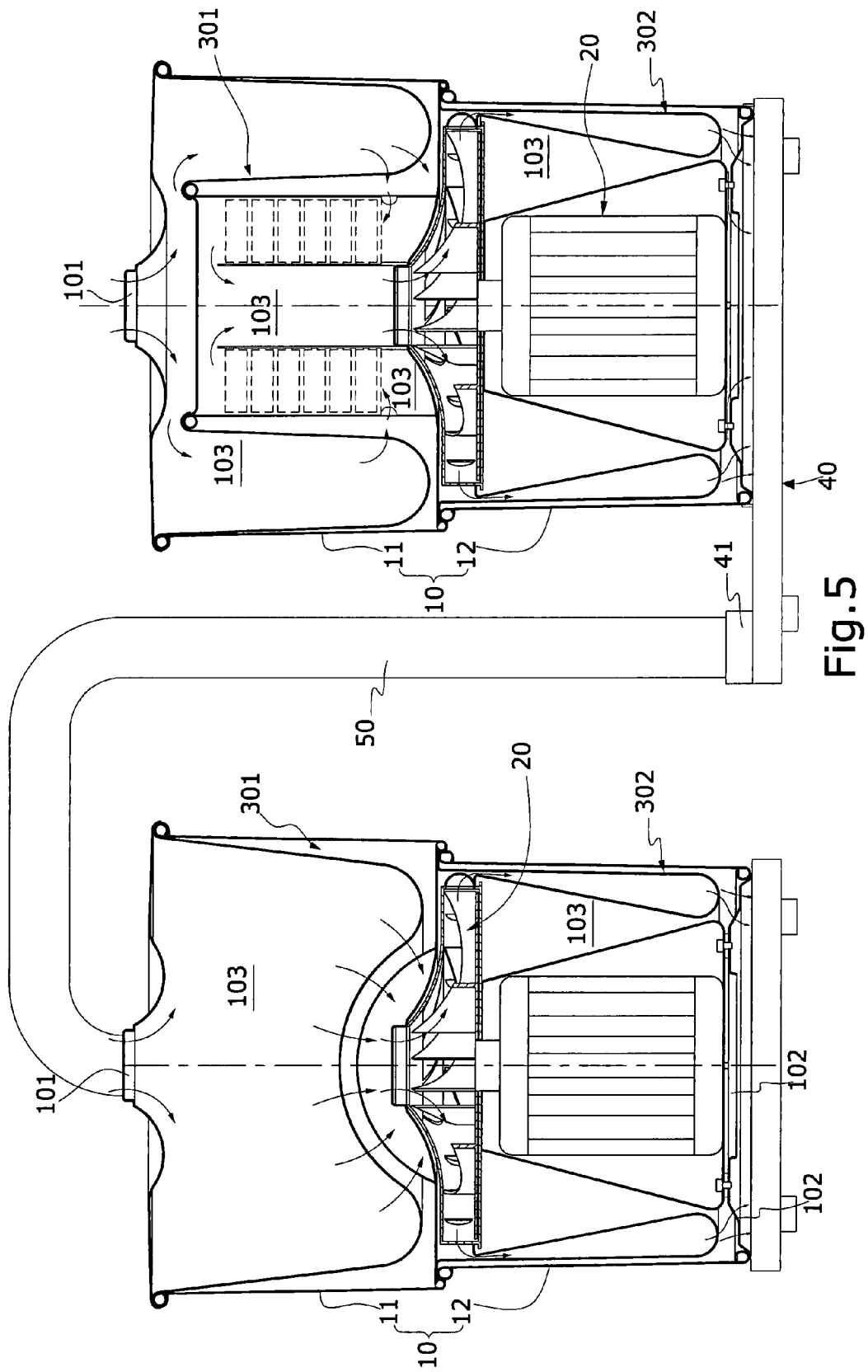
FIG. 5 shows a cross-sectional view of yet another embodiment assembled according to the present invention.

Referring to FIG. 5, wherein a bottom cover 40 is located at the bottom surface of the lower cylindrical body 12 of the air separator and purifier device, and the bottom cover 40 covers the air vents 102 of the bottom surface of the lower cylindrical body 12. One side of the bottom cover 40 protrudes out from the surrounding wall of the lower cylindrical body 12, and a pipe joint 41 is upwardly fitted thereon. Accordingly, after a pipe 50 is connected to the pipe joint 41 of the bottom cover 40, then the other end of the pipe 50 can be directly connected to the air inlet 101 at the upper end of another air separator and purifier device, thereby achieving a series connected multiple filtration effect, which further increases practicability and economic value of the present invention.

In conclusion, the air separator and purifier device of the present invention is clearly able to achieve filtering of impurities contained in air, including dust, ash and smoke, oil and smoke or moisture, and so on, and is able to extend effectiveness of the serviceable life of the main air extractor 20. Moreover, prior to this application, products having a similar structure to that of the present invention have not been seen in publications or in public use, thus complying with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An air separator and purifier device, comprising a main air extractor installed within a cylindrical housing, an air inlet and an air vent are provided in the upper and lower ends of the housing respectively, thereby forming a filter passageway, and more than one layer of filtering equipment are installed in the filter passageway, wherein:

the housing comprises a superposition of an upper cylindrical body and a lower cylindrical body, the air inlet is defined in a top surface of the cylindrical body, and a plurality of air vents are located in a bottom surface of the lower cylindrical body, a partition plate is located between the upper cylindrical body and the lower cylindrical body, and a round hole is defined in the center of the partition plate;

the main air extractor is installed in a central position of the lower cylindrical body, and comprises a dish shaped case fixed to a motor, and turbine blades are installed within the dish shaped case, the turbine blades are joined to a rotating shaft of the motor, thereby enabling the turbine blades to rotate, a top surface of the dish shaped case is provided with an air suction port, and a plurality of gill shaped air outlets are annular defined along a tangential direction of a side wall of the dish shaped case;

the filtering equipment comprises a preseparation structure installed within the upper cylindrical body and an air filter screen located within the lower cylindrical body.

2. The air separator and purifier device according to claim 1, wherein the preseparation structure within the upper cylindrical body is a dust collecting set, which comprises a dust collecting bag and a wire mesh; the dust collecting bag assumes a circular bag form, the bag opening of which is mounted between the rim of an upper end opening of the upper cylindrical body and a top cover; the wire mesh assumes a hemispherical form, and covers the round hole of the partition plate located between the upper and lower cylindrical bodies.

3. The air separator and purifier device according to claim 1, wherein the preseparation structure within the upper cylindrical body is an air purifying set, which comprises a ring-like dust collecting bag, a middle cylinder, an inner tube, and multiple layers of air filter material located between the middle cylinder and the inner tube; the middle cylinder is fixed to the partition plate located between the upper and lower cylindrical bodies, and a cover plate is located on the top surface of the middle cylinder; a plurality of gill shaped air outlets are annular defined along a tangential direction of a wall at a bottom end of the middle cylinder, and the inner tube is mounted on the round hole located center of the partition plate; a section of space is provided between the top end and a bottom surface of the cover plate of the middle cylinder, an outer rim of the ring-like dust collecting bag is mounted between the upper end rim of the upper cylindrical body and the top cover, and an inner rim of the ring-like dust collecting bag is mounted between the top edge of the middle cylinder and the cover plate.

4. The air separator and purifier device according to claim 1, wherein the preseparation structure within the upper cylindrical body is an oil and gas separating set, which comprises a ring-like oil collecting mesh, a middle cylinder, an inner tube and multiple layers of air filter material located between the middle cylinder and the inner tube; the ring-like oil collecting mesh is disposed between the inner wall of the upper cylindrical body and the outer wall of the middle cylinder; the middle cylinder is fixed to the partition plate located between the upper cylindrical body and the lower cylindrical body, a plurality of outward gill shaped air outlets are annular defined along a tangential direction of a wall at the top end of the middle cylinder; a cover plate is located at a lower edge of the gill shaped air outlets, and a plurality of inward gill shaped air outlets are annular defined along a tangential direction of the wall at the bottom end of the middle cylinder; the inner tube is mounted on the round hole located center of the partition plate, and a section of space is provided between the top end of the inner tube and the bottom surface of the cover plate of the middle cylinder.

5. The air separator and purifier device according to claim 1, wherein the air filter screen within the lower cylindrical body assumes a ring-like bag form; an outer rim of the air filter screen is mounted on the upper end rim of the lower cylindrical body, an inner rim of the air filter screen is mounted on a bottom plate of the dish shaped case of the main air extractor, and the mesh of the air filter screen is smaller than that of the filter screen of the preseparation structure or the mesh of the filter material.

6. The air separator and purifier device according to claim 1, wherein a bottom cover is located at the bottom surface of the lower cylindrical body; the bottom cover covers the air vents of the bottom surface of the lower cylindrical body, one side of the bottom cover protrudes out from the surrounding wall of the lower cylindrical body, and a pipe joint is upwardly fitted thereon.

* * * * *